June 10, 1958     D. S. GREY     2,837,967
DEVICES FOR VIEWING BINOCULARLY FUSIBLE
OBJECTS SUCH AS PHOTOGRAPHIC IMAGES
Filed Sept. 17, 1953     3 Sheets-Sheet 1

INVENTOR
David S. Grey

BY Brown and Mikulka
and
Moncure B. Berg
ATTORNEYS

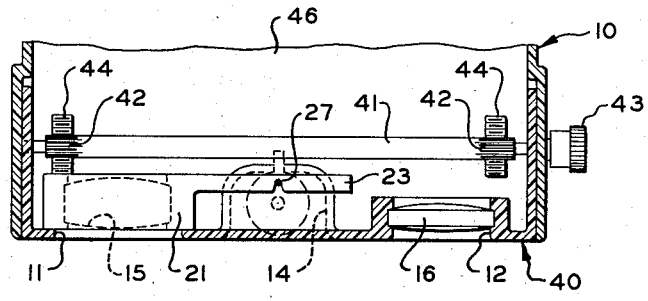
FIG. 4
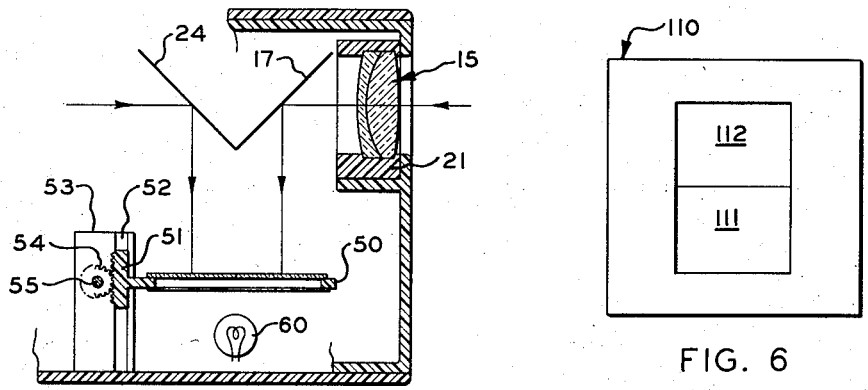
FIG. 5
FIG. 6
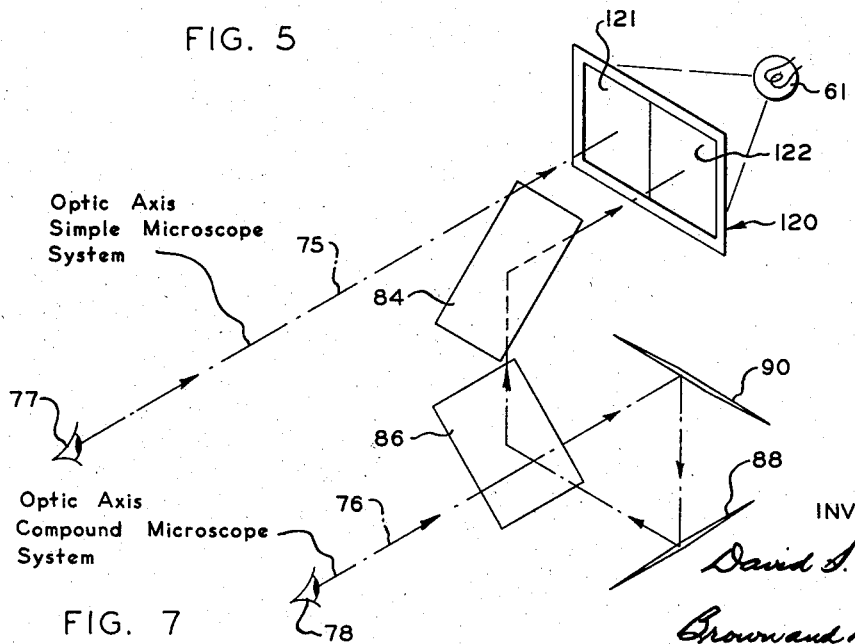
FIG. 7

United States Patent Office 2,837,967
Patented June 10, 1958

2,837,967
DEVICES FOR VIEWING BINOCULARLY FUSIBLE OBJECTS SUCH AS PHOTOGRAPHIC IMAGES

David S. Grey, Weston, Mass., assignor to Polaroid Corporation, Cambridge, Mass., a corporation of Delaware Application September 17, 1953, Serial No. 380,778

10 Claims. (Cl. 88—29)

This invention relates to viewing devices for carrying out the binocular fusion of a pair of fusible objects, such as a pair of binocularly fusible picture images or the like, and particularly to a readily portable binocular viewer especially suited for viewing picture slide transparencies.

An object of the invention is to provide a binocular viewing device for viewing a pair of similar and fusible objects such as photographic images wherein said device employs two lens systems, one in the form of a simple microscope which provides means for viewing a first one of said pair of images and a compound microscope for viewing the other of said pair of images, the device including a pair of viewing apertures which are normally coincident with the respective exit apertures of said microscope systems, means for mounting the pair of objects or photographic images at a viewing station or stations, and reflector means optically aligned on the optic axis of at least one of said microscope systems for reflecting said optic axis toward a mounted image.

Other objects of the invention are to provide a binocular viewer of the character described wherein said reflector means comprises four plane reflecting surfaces which are arranged in pairs with the members of each pair positioned so that the planes of the respective reflecting surfaces thereof are at right angles to each other and so that the line of intersection of the planes of one pair of reflecting surfaces is skewed at 90° from the line of intersection of the planes of the other pair of reflecting surfaces; to provide binocular viewing devices such as described wherein all four of said reflecting surfaces are aligned on the optic axis of the compound microscope system or wherein three of said reflecting surfaces are aligned on the optic axis of the compound microscope system and the other reflecting surface is on the optic axis of the simple microscope system as well as where two reflecting surfaces are aligned on the optic axis of each of said microscope systems.

Further objects of the invention reside in the provision of a binocular viewing device of the character set forth which is provided with means for adjusting the focus of said microscope systems for viewing and also with means for adjusting the binocular convergence of the viewer; and to provide binocular viewing devices of the character described which are adapted to be handheld and in which said images are removably mountable and which include light source means for illuminating said images.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a schematic plan view of the optics for a preferred embodiment of the invention;

Fig. 2, taken on the line 2—2 of Fig. 1, shows a part of the optics of Fig. 1 in elevation;

Fig. 4 is a sectional plan view on the line 4—4 of Fig. 3, but with parts omitted and broken away, and schematically illustrates a lens-mounting arrangement which permits convergence adjustment for the viewer as well as a preferred constructional arrangement for adjusting the focus of the lenses employed with the viewer;

Fig. 5 is a schematic longitudinal sectional elevation, with parts broken away and omitted, and illustrates another constructional arrangement for focusing the viewer;

Figure 8:
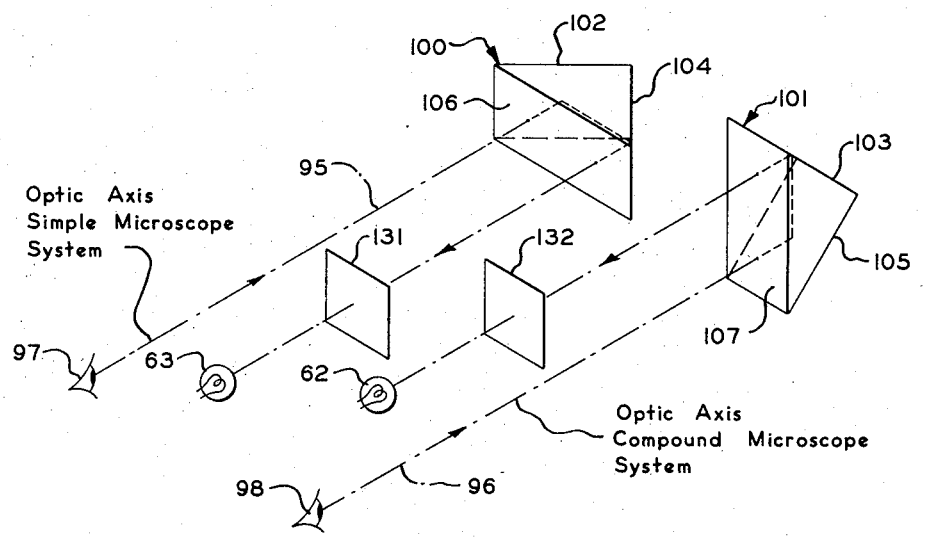

Fig. 6 schematically illustrates, for use with a viewer of the character shown in Figs. 1 through 5, an arrangement of a binocularly fusible or a stereoscopic pair of images on an individual frame of 35 mm. film carried in a conventional cardboard slide or picture mount;

Fig. 7 is a perspective view schematically showing another embodiment of optics useful in carrying out the invention; and Fig. 8 is a perspective view schematically showing a still further embodiment of optics useful in carrying out the invention.

This invention, as has already been pointed out, is concerned with devices for viewing a pair of binocularly fusible objects. An excellent example of a pair of binocularly fusible objects as well as an example which is especially suited for the explanation of the invention is a pair of stereoscopic photographs or a stereoscopic picture slide. However, it will be understood that the viewer devices of this invention are adapted for the viewing of pictorial representations or reproductions produced by other than photographic means, as for example binocularly fusible line or other drawings, paintings, cutouts such as silhouettes and the like, as well as for the viewing of physical articles which are binocularly fusible.

One conventional embodiment of a device for viewing a pair of stereoscopic images in the form of transparencies utilizes a design and construction wherein the images are mounted in a viewing plane at a separation equal to the desired interpupilary separation employed for viewing purposes and are viewed by an observer through a pair of spaced-apart eye lenses located so that a plane common to the optic axes of said lenses intersects the viewing plane in a line which passes through the centers of the mounted images and is perpendicular to said viewing plane. In conventional viewers of the character described, a pair of stereoscopic images are intended to be mounted in the viewing plane thereof so that they are in similarly rotated condition and also so that the top and bottom of the respective images are aligned with each other.

The present invention is concerned with viewing devices wherein a pair of lens systems, spaced apart by a desired interpupilary distance, are utilized for viewing a pair of binocularly fusible and similarly rotated objects such as photographic or other images and which (1) are arranged in unseparated condition, i. e., have two edges which are substantially common or coincident or in contact, or (2) are spaced apart relative to the spacing between the optic axes of the eye lens systems by a separation which is less than the selected interpupilary distance and are aligned with each other, or (3) fulfill the requirements of arrangement 2 with the exception that they are unaligned.

By the practices of this invention, the viewing of a pair of fusible articles or photographs, drawings and the like may be carried out with the images of the pair mounted for viewing in accordance with any of the three mounting arrangements heretofore described. As will subsequently become apparent, the first arrangement is preferred when stereoscopic images are concerned. The second and third image-mounting arrangements, while usable for viewing a stereoscopic pair of reproductions, are specially suited in instances where it is desired to compare two objects which are not a stereoscopic pair but which are binocularly fusible, as for example a print of a standard and a print of a sample wherein both prints and their originals were made under substantially the same conditions, or in the comparison of two prints or originals of a pair of graphs which portray the same subject matter but which vary from each other in their appearance.

The combination of reflecting means in one or in both of the lens systems employed with the viewer of this invention makes it possible to view a pair of binocularly fusible objects supported at viewing stations in accordance with any of the three viewing arrangements just described. Four plane reflectors, associated with the two lens systems, are employed for reflectively displacing the optic axis of one of the lens systems onto the viewing station of that system or are employed in the two systems for reflectively displacing the optic axes thereof onto the respective viewing stations for said lens systems. By one embodiment, all reflectors are associated with one of the lens systems of the viewer while in another embodiment two reflectors are associated with each of the two lens systems and in a preferred embodiment one reflector is associated with one lens system and three reflectors are associated with the second lens system. Preferably, the viewing stations of the device are located so that the pair of objects or photographic images may be supported in a common plane. However, this condition for the support of an object pair in a common plane, while desirable from the standpoint of simplicity of viewer construction and design, is not an essential for the practice of the invention.

The preferred embodiment of the invention is especially suited for viewing a transparent stereoscopic pair of images, formed in a standard frame of 35 mm. film and on an image-bearing portion of the film which is adapted to be mounted within a conventional and commercially available cardboard mount to provide a picture slide. Figs. 1 through 5 illustrate binocular viewer details for carrying out the preferred embodiment of the invention while Fig. 6 schematically shows a stereoscopic picture slide of the nature just described.

It has been found desirable from the standpoint of economical film use as well as in aid to simplified camera construction, to form a transparent stereoscopic image pair within a single standard sized frame of 35 mm. film. One commonly used image area for 35 mm. film is of rectangular shape and of a nominal size equal to 24 mm. x 36 mm. By one practice, which is set forth in my copending application Serial No. 378,623, filed September 4, 1953, now U. S. Patent No. 2,784,645, as well as in application Serial No. 378,618, filed September 4, 1953, of which I am a joint inventor, a rectangular area of a size similar to that described may be optically divided transversely of itself into two rectangularly shaped image areas or stereoscopic frames in one of which a left-eye stereoscopic image is formed and in the other of which a right-eye stereoscopic image is formed. By this practice, the short dimension of the image areas chosen for two-dimensional portrayal becomes the long dimension for each stereoscopic picture area. In this arrangement, the pair of rectangularly shaped stereoscopic picture areas will occupy an overall area which is sufficient to fill the picture mount aperture of a cardboard picture mount 110 such as that shown in Fig. 6 and comprising two cardboard apertured members which are secured in superposed relation with a picture-bearing portion of 35 mm. film mounted therebetween and in register with the openings in the apertured members of the mount. The picture slide of Fig. 6 is schematically illustrated as of stereoscopic character and as being provided with an uppermost picture area for a right-eye image 112 of a stereoscopic image pair and a lowermost stereoscopic picture area for a left-eye image 111 of said pair.

For the conventional 24 mm. x 36 mm. image area previously mentioned, each stereoscopic picture area will possess dimensions of 18 mm. x 24 mm. The stereoscopic frames of film of this type may be exposed so that the images of vertical objects are parallel to the short dimension of each rectangular area and so that the stereoscopic images will be substantially unseparated from each other and with one long edge of one image substantially coincident with the long edge of the other image of the pair. When such is the case, each image of the pair is similarly rotated whereby both images are erect and are positioned so that the subject matter of each proceeds from left to right in the same sense.

As observed from the viewing side of the film mounted in the slide 110, images 111 and 112 are preferably formed so that the bottom of the left-eye image 111 and the top of the right-eye image 112 are substantially coincident with each other and with the images oriented with the left on the left and right on the right. As will presently appear, the slide 110 is adapted to be located in the viewing plane of a viewing device employing the optics of Figs. 1 and 2 so that the two images are oriented up and down and left to right in the manner described when viewed from the observation plane by a person using the viewer. Should, however, image 111 be the right-eye image and image 112 the left-eye image, then the physical positions in the viewer of the simple and compound microscope systems and mirrors associated therewith should be reversed whereby the right-eye image is viewed through the simple microscope system and the left-eye image is viewed through the compound microscope system.

Figure 3:
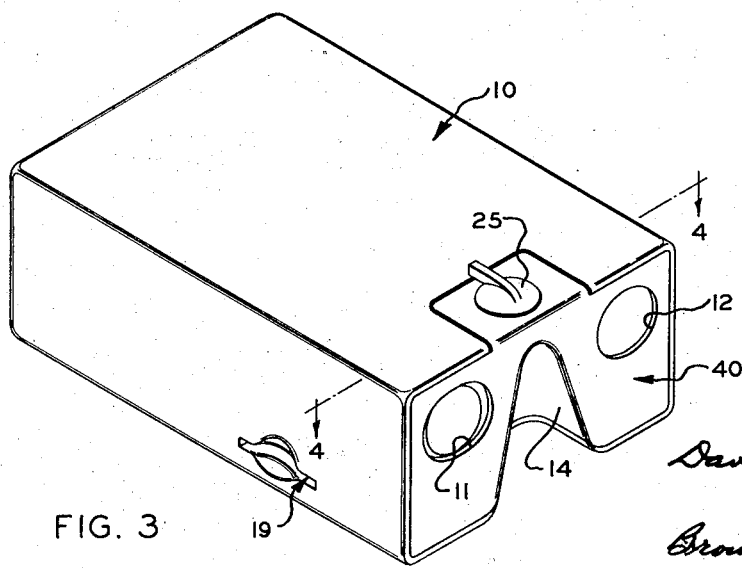
Fig. 3 shows in perspective the exterior appearance of a slide viewer within which the optics of Fig. 1 are mountable.

In all embodiments of the invention, the optics of the binocular viewer are supported in conventional manner within a housing 10 of the general nature illustrated in Fig. 3. For this purpose the optics may be carried or mounted upon a suitable frame structure or means which are removably or fixedly mounted within the housing 10. Apertures 11 and 12, adapted to be used by an observer for viewing a slide mounted within the device, are provided at one end of the housing 10, which, except for an elongated slot employed for loading a slide into the viewer, is otherwise closed.

The optics for all embodiments of the invention comprise a simple microscope system aligned with one of the viewing apertures, a compound microscope system aligned with the other viewing aperture, for plane reflecting surfaces which are associated with one or with both of the microscope systems and a light source for illuminating a pair of binocularly fusible objects of the character described and supported at two viewing stations within the housing 10. The front end of the housing 10 is preferably constructed to provide a nasal recess 14 between the viewing apertures 11 and 12.

Figure 1:
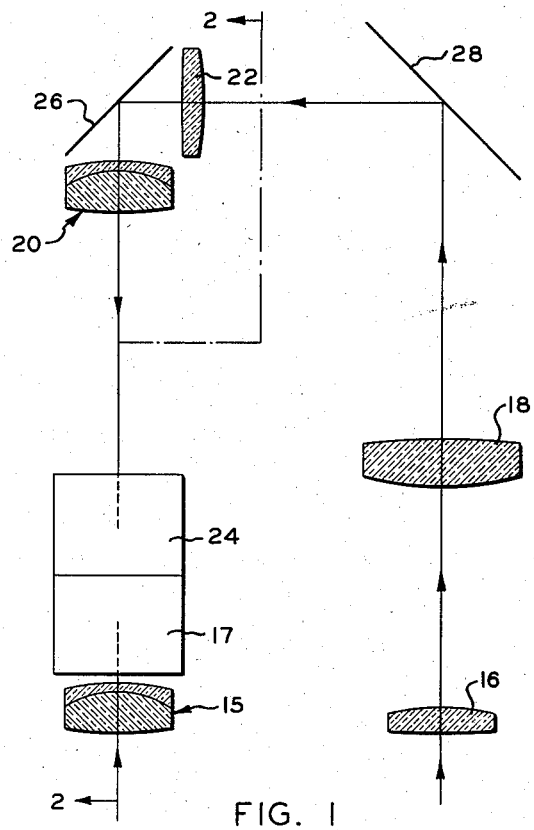
Figure 2:
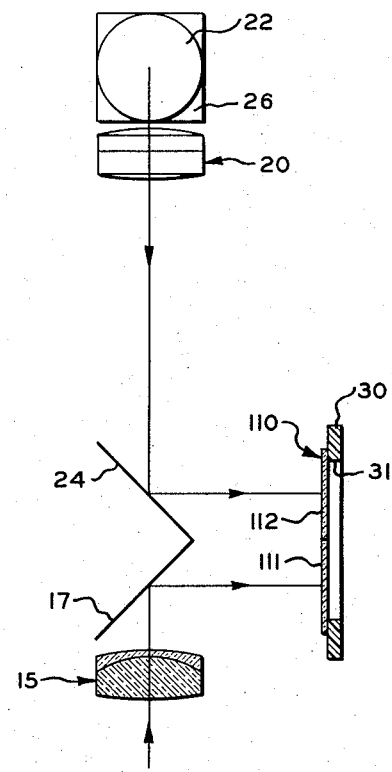

As shown in Figs. 1 and 2, the simple microscope system comprises an eye lens 15 in the form of a doublet while the compound microscope system comprises an eyepiece having two separated eye lenses 16 and 18 and an objective or relay lens means constituted by the doublet 20 and the single lens 22.

In the preferred embodiment of the invention, as shown in Figs. 1 and 2, the two microscope systems are so mounted that parts of the optic axes thereof lie substantially in a common plane between the respective entrance and exit pupils of said systems. Each microscope system is adapted to have the optic axis thereof reflected in a direction which is perpendicular to the just-described common plane at a position between the entrance pupil and the object to be observed. This perpendicular reflection as illustrated in Figs. 1 and 2 is directed downwardly onto two image-mounting or viewing stations located in a plane which is substantially parallel to that portion of the optic axes of the microscope systems which lie in said common plane. The viewing stations themselves each constitute a half of a support platform 30 upon which a pair of stereoscopic images 111 and 112 of an image-bearing film portion in mount 110 are supported.

The downward perpendicular reflection of the optic axis of the simple microscope system is effected by a mirror 17 which is optically aligned with the eye lens 15 and the viewing station for the left-eye image of a stereoscopic image pair supported thereon while that for the compound microscope system is effected by the mirror 24 which is optically aligned with the component 20 of the objective and the right-eye viewing station. The mirrors or reflectors 17 and 24 are mounted so that the planes of their respective reflecting surfaces intersect each other at 90° and have their line of intersection located directly over the position occupied by the common edges of the stereoscopic image areas 111 and 112 of a pair of images in a mount 110 mounted in viewing positions on platform 30.

As may be noted in Figs. 1, 2 and 3, the view- or slide-mounting platform 30 is located below the eye lens 15 for the left-eye image, that is to say, the platform is positioned on the left side of the viewing device. While mirror 17 effects the optical alignment of the left-eye viewing station with the simple microscope 15, mirror 24 optically aligns the right-eye viewing station with only the lens component 20 of the objective of the compound microscope because of the fact that the eye lens 15 and eyepiece 16, 18 are displaced with respect to each other at the selected interpupilary distance. To carry out the necessary displacement of the light path between the lens 20 and the eyepiece 16, 18, two plane reflecting surfaces or mirrors 26, 28 are suitably aligned on the optic axis of the compound microscope.

Mirror 26 is positioned between the lens elements 20, 22 of the objective of the compound microscope and, as illustrated, reflects the optic axis at 90° to its direction between the lens elements 20 and the mirror 24. A further 90° reflection is, as illustrated, performed by mirror 28 between the lens element 22 of the objective of the compound microscope system and the lens 18 of the eyepiece thereof. Mirrors 26 and 28 are spaced apart by the selected interpupilary distance for the viewing device. Thus, it may be observed that the portion of the optic axis of the compound microscope between its exit pupil and the mirror 28 lies in a plane which is parallel to the plane containing the portions of the optic axis of the compound microscope between the mirror 26 and the right-eye viewing station on the platform 30.

Mirrors 26 and 28 are positioned with respect to each other so that the planes of their reflecting surfaces intersect at 90°. The plane reflecting surfaces, in all embodiments of the invention, are adapted to be arranged in pairs. The reflecting surfaces of each pair are positioned to be perpendicular to each other, i. e., so that the planes thereof intersect each other at a 90° angle. Also in all embodiments of the invention, as is particularly well illustrated in Figs. 1 and 2, each mirror pair is arranged differently with respect to each other pair. Thus, the line of intersection of the plane reflecting surfaces of one pair of reflectors, for example the mirrors 17 and 24, is skewed at 90° from the line of intersection of the plane reflecting surfaces of the other pair of reflectors 26, 28. By lines skewed at 90°, I mean a pair of skew lines so located with respect to each other that a first one of the lines must be rotated through 90° about an axis perpendicular to said first-mentioned line in order to render the two lines nonskewed, i. e., to render the two lines parallel or intersecting. Another way of expressing this arrangement is that the lines of intersections of the reflecting pairs, when viewed in space, are nonintersecting lines which are perpendicular to each other.

The view-mounting platform 30 may be fixedly supported within the viewer housing 10 or, for a purpose which will presently appear, the platform 30 may be adjustably mounted for movement toward and away from the mirrors 17 and 24. In either event, access to the platform for mounting a slide 110 thereon as well as for removing the slide is gained through a suitable elongated port or slot 19 which extends through the left wall of the housing 10, as is illustrated in Fig. 3.

Also, the view-mounting platform is provided with an aperture 31 which is coextensive with the viewing station portions thereof whereby suitably positioned light source means such as an electric bulb 60, illustrated in Fig. 5, may be utilized for illuminating a transparent slide 110 mounted upon the platform. In this regard, the usual electric circuit employed with hand viewers and comprising a light source, battery and switch means is mounted in a conventional manner within the housing 10 and forms a part of the viewing device. Since illuminating means of this character are well known to the art, specific illustration of them has been omitted for the purpose of simplification of the drawings with the exception of the schematic showing of the light source 60.

In operation of the viewer of Figs. 1 through 5, a slide 110 is positioned on the platform 30 with images 111 and 112 oriented as described and with the top of the left-eye image 111 located the nearest to the forward or apertured end of the housing 10. A user of the viewer then illuminates the mounted slide 110 and looks through the eye lens 16 of the compound microscope with his right eye and the eye lens 15 of the simple microscope with his left eye to see only the right-eye image 112 with his right eye and only the left-eye image 111 with his left eye.

The fact that mirror 17 will erect the image 111 without reversing it left for right, makes it apparent why the image is mounted on the viewing platform 30 with the top edge of the image 111 the nearer to the observation plane. Since the eye lens 15 of the simple microscope system will neither invert an image or reverse it left for right, it will be apparent that the view of the image 111 obtained by an observer in his left eye will be both erect and unreversed left for right. In the compound microscope system, mirrors 24, 26 and 28 will effect reversals of the right-eye image 112 both left for right and up for down. However, due to the arrangement of the mirrors, as well as the orientation at which the image 112 is mounted upon the platform 30 and also because of the fact that the lenses 20 and 22 will reverse an image in an up and down direction as well as left for right, the view of the picture image 112 obtained by an observer with his right eye will be erected and unreversed in the same sense as the view of the picture image 111 obtained by an observer looking through the simple microscope system.

The embodiment of the invention disclosed in Figs. 1 and 2 is subject to variations, all generally utilized for the purpose of desired modification of the design, shape and construction of the housing in which the optics of Figs. 1 and 2 are located. For example, the mirror pair 17 and 24 may be mounted in a position which is inverted with respect to that shown so that the viewing platform 30 is locatable above the mirrors instead of below them. Additionally, the mirrors 17 and 24 may be rotated about their line of intersection as an axis without disturbing the general characteristics of the optical systems heretofore described. When the mirrors are rotated in this manner, it becomes necessary to appropriately rotate the platform 30. Both of the just-described modifications, which are deemed to fall within the scope of the invention, facilitate housing design, as for example by permitting the nose recess 14 to be made deeper as well as by permitting the overall thickness of the housing to be decreased.

It is desirable to provide the viewer with means for adjusting binocular convergence. One convergence adjustment of this nature is schematically shown in Fig. 4 wherein eye lens 16 is fixedly mounted, by conventional means, in the right-eye aperture 12. As further observed in Fig. 4 and also in Fig. 3, the left-eye aperture 11 of the housing 10 is wider or of greater diameter than the right-eye aperture 12. However, the center of the aperture 11 is normally coincident with the exit aperture of the simple microscope system. The use of an enlarged aperture 11 permits the eye lens 15 of the simple microscope to be mounted in a support member 21 which is movable laterally of the housing 10 toward and away from the fixed eye lens 16. Lens-mounting support 21 is provided with an arm 23 which is adapted to extend in substantially parallel relation to the top and bottom surfaces of the viewer housing 10 and toward the eye lens 16. While not shown, conventional slideways are provided for slidably mounting the lens support 21 and conventional retaining means, also omitted from the drawing, are utilized for retaining the lens support 21 in the slideways.

A rotatably adjustable knob or wheel 25 is mounted at the support end of the housing 10 on the outer surface side of the top of the housing at a position centrally of the viewer device. Operating knob 25 is provided with a crank pin 27 which extends through an appropriate slot in top of housing 10 and is engaged in a notch 27 provided in the arm 23. The position of the wheel 25 relative to pin 27 and arm 22 of the slidable support 21 is shown in dotted lines in Fig. 4. It will be apparent that upon appropriate rotation of the operating knob 25, separation of the eye lens 15 from the eye lens 16 may be controlled to obtain the desired binocular convergence of the viewer.

The viewing device may be maintained at a fixed focus and the illustrations of Figs. 1 and 2 may be taken as showing a viewing device of this nature. For focusing adjustment, two methods are possible. In one case, the simple microscope system 15 and the eye lens 16 of the compound microscope system are designed to have substantially the same focal length and are mounted for simultaneous movement along the optic axis of each system. In a second method for focusing the viewing device, the view-mounting platform, such as the platform 30, is mounted for movement along the reflected portions of the optic axes of the two microscope systems.

When the viewer is focused by the second-mentioned method, the image of the observer's right eye as seen from the right-eye focal plane and looking through the right-eye optical system should be substantially at the same distance from the right-eye focal plane as is the distance of the image of the left eye of the observer, as similarly viewed through the left-eye system. Unless this precaution is carried out, the magnification for the right- and left-eye optical systems will vary unequally when the systems are focused.

In Fig. 4 an arrangement is disclosed wherein the forward end of the viewer housing is open and has telescopically and slidably fitted or mounted therein a lens-holding head 40 provided with apertures 11 and 12 of the character heretofore described and having eye lenses 15 and 16 mounted therein. When a mounting head is utilized, the operating knob 25 and mechanism associated therewith is carried on the head and the top surface of the housing may be suitably cut away to permit unobstructed movement of the slidable head 40.

The lens-mounting head 40 is moved inwardly and outwardly of the housing 10 by means of a shaft 41 provided with spaced pinion means 42 adapted to engage racks 44 fixed to the lower inner surface 46 of the lens-holding head. Shaft 41 is journalled in the side walls of the housing 10 and is provided with a portion which extends through a side wall and has an operating knob 43 thereon. While not shown, the side wall portions of the lens-holding head 40 are appropriately cut away, as will be well understood to the art, to permit pinion shaft 41 to be mounted within the housing 10. Rotation of the knob 43 in an appropriate direction will cause the lens-holding head 40 to be moved inwardly and outwardly of the main housing 10 and consequently will effect movement of the eye lenses 15 and 16 along the optic axes of the microscope systems.

Fig. 5 discloses another embodiment for focusing the viewer. In this instance, both eye lenses 15 and 16 are adapted to be fixedly mounted in the housing against movement along their respective optic axes. A view-mounting platform 50, similar to the platform 30, is utilized in the arrangement of Fig. 5 and is slidably mounted for movement along the reflected portions of the optic axes of the two microscope systems to permit focusing of the two lens systems. For this purpose, platform 50 is provided at one end with slide members 51 which are slidably supported in guides 52 formed on spaced-apart posts 53. The posts 53 are mounted on the bottom of the viewer housing 10, adjacent opposite sides of the housing. Slide 51 is provided with two spaced-apart portions, each of which carries a rack 54 adapted to mesh with spaced-apart pinions 55 carried on a suitable rotatably mounted shaft which extends through the housing and is provided on the right side of the housing with an operating knob (not shown). Rotation of the pinion means 55 will effectively rack or move the platform 50 along the reflected portions of the optic axes of the two microscope systems as desired.

Means for adjusting the interpupilary distance or separation between the two lens systems of Figs. 1 and 2, and for that matter of the other viewer embodiments to be subsequently disclosed, are deemed to fall within the scope of the invention. With optical systems such as those illustrated in Fig. 1, the eye lens 15 of the simple microscope system and the erecting lenses 20, 22 and the mirror 26 of the compound microscope system may be mounted upon a slide member slidably carried for movement toward and away from the optics contained in the right portion or side of the viewer whereby to effect an interpupilary adjustment. In this arrangement, the viewing station for the binocularly fusible object or image adapted to be viewed through the compound microscope system should be located so that it is substantially at the focus of the lens 20 of the compound microscope whereby to permit interpupilary adjustment without alteration of the focus of the compound microscope.

Another embodiment of a viewer employs optics wherein all four of the reflecting surfaces are located in the compound microscope system and the simple microscope system is utilized to directly view one of a pair of binocularly fusible images without reflection of the optic axis of the simple microscope system. An optical arrangement of this character is schematically illustrated in Fig. 7.

In Fig. 7, a left-eye, binocularly fusible object such as a photographic image 121 and a right-eye, binocularly fusible object such as a photographic image 122 are schematically shown as mounted within a picture slide 120 and are located at appropriate viewing stations in the viewing plane of a viewer device equipped with microscope systems of the character described. For the purpose of illustrating the versatility of the system forming the subject matter of this invention, the binocularly fusible images 121 and 122 have been shown as positioned with respect to each other so that the right side of the left-eye image 121 and the left side of the right-eye image 122 are substantially coincident and so that the tops and the bottoms of the stereoscopic image pairs 121, 122 are substantially in alignment with each other. However, as will be apparent to those skilled in the art, the embodiment of the invention disclosed in Fig. 7 may be practiced with the picture images located with respect to each other in a manner similar to that disclosed in connection with the slide 110 of Fig. 6, or more specifically so that the bottom of the left-eye image 121 is substantially coincident with the top of the right-eye image 122. Furthermore, the left- and right-eye images 121 and 122 may be arranged in the manner illustrated in Fig. 7 except that they are separated so that their centers are spaced apart by a distance less than the interpupilary distance employed by the viewer and may be aligned with each other or occupy unaligned positions in the view-mounting plane.

The left-eye photographic image 121 of the slide 120 is adapted to be viewed directly through a simple microscope system, the optic axes 75 of which, without reflection or displacement, passes through the center of the viewing station for the left-eye image 121. The right-eye stereoscopic image 122 is adapted to be viewed through a compound microscope system, the eyepiece of which is spaced from the eye lens of the simple microscope system by a separation equal to the desired interpupilary distance. As in the case of the embodiment of the invention disclosed in Figs. 1 and 2, it is necessary in the arrangement illustrated in Fig. 7 to displace the optic axis 76 of the compound microscope system so that it passes through the center of the right-eye image 122.

For the sake of simplification of the drawings, only the optic axes 75 and 76 of the microscope systems have been disclosed in Fig. 7. A compound microscope system and a simple microscope system substantially similar to the compound and simple microscope systems disclosed in Figs. 1 and 2 are intended to be employed in the viewer embodiment of Fig. 7. To assist in understanding the invention, the location of observation positions or stations 77 and 78 for viewing a pair of binocularly fusible images mounted in the viewing plane of the viewer are indicated by the eyes of a person who is looking into the viewer through the usual apertures provided at the forward end of the housing for the viewer optics.

To carry out the necessary reflections of the optic axis 76 of the compound microscope system whereby it is suitably displaced so as to intersect the center of the right-eye image 122, four plane reflecting surfaces 84, 86, 88 and 90 are appropriately positioned in the manner described so that the planes of one pair of reflecting surfaces 86, 88 intersect each other at 90° and have their line of intersection skewed at 90° to the line of intersection of the planes of the other pair of reflecting surfaces 84 and 90 which also intersect each other at 90°.

The eyepiece of the compound microscope has the two lenses thereof positioned between the eye station 78 and the mirror 90 while the relay lenses of the compound microscope, which are used for image erecting and reversing purposes, are preferably located on the optic axis between the mirrors 84 and 86, although these erecting lenses may be positioned at any location on the optic axis which is appropriate for carrying out the invention. The eye lens of the simple microscope system is positioned adjacent the observation station 77. Up and down and/or left and right reversals of the right-eye image introduced by reflections at the mirrors 84, 86, 88 and 90 are reversed by the erecting lenses or objective of the compound microscope so that the view seen by the eye 78 is in the same condition of rotation as the image 122 in the view-mounting plane. Since the left-eye image of the slide 120 is in a rotated condition similar to that of the right-eye image 122 and since the simple microscope system merely magnifies, without reversing, an image viewed therethrough, the left-eye image 121 will appear in erect and unreversed condition to the left eye at the observation station 77. Light source means 61 are suitably located for illuminating the image pairs 121 and 122.

Suitable means for adjusting the binocular convergence of the two microscope systems and for effecting the focusing of the systems, as well as for adjusting the interpupilary separation for the viewer, are employable with the embodiment shown in Fig. 7. Operation of the viewer equipped with the optics of Fig. 7 will be substantially similar to the operation of the viewer heretofore described. In addition, it will be appreciated that the optics of the device illustrated and described in connection with Fig. 7 may be housed in a manner similar to that described in connection with Figs. 1 through 5.

Fig. 8 schematically illustrates another embodiment of binocular viewer optics which utilize a simple microscope located on the optic axis 95 for viewing a left-eye, binocularly fusible object such as a photographic image and a compound microscope having an optic axis 96 for viewing a right-eye, binocularly fusible object such as a photographic image 132 with the optic axes of the two microscope systems spaced apart at the observation stations 97 and 98 by a separation equal to the selected interpupilary distance. The optical embodiment in Fig. 8 differs from those heretofore illustrated in that two of the four reflections are carried out in each microscope system and also in that it is essential in this embodiment to utilize a pair of separate and individual images each of which is carried in an individual mount.

The two reflections of the optic axis of each microscope system are carried out by a pair of prisms 100 and 101 which are individually associated with each microscope system. The image pairs 131 and 132 are mounted in the same viewing plane with the center of the right-eye image 132 elevated with respect to the center of the image 131. The separation, in the horizontal sense, between the centers of the images 131 and 132 is selected so as to permit the use of the desired interpupilary separation for the eye lenses of the two microscope systems. The separation of the centers of the images 131 and 132, in a vertical sense, is dependent upon the length of the vertical displacement achievable by the prism 101 associated with the compound microscope system and so that the optic axis 96 between the reflecting surface 105 of the prism 101 and the right-eye observation station 98 will lie in the same plane as the optic axis 95 between the reflecting surface 102 of the prism 100 and the observation station 97.

Prisms 100 and 101 each have an entering face and two reflecting faces with the reflecting faces being positioned at right angles to each other. In this regard, the prism 100 is provided with two plane reflecting surfaces 102 and 104, while the prism 101 is provided with two plane reflecting surfaces 103 and 105. The entrance faces of the prisms 100 and 101 are respectively indicated by the reference numerals 106 and 107. As may be observed in Fig. 8, prisms 100 and 101 are adapted to be mounted so that the line of intersection of the reflecting surfaces 102 and 104 of the prism 100 lies in a plane which is skewed at 90° to the line of intersection of the reflecting surfaces 103 and 105 of the prism 101. As a result of this arrangement, the prism 100 reverses the image 131 from left to right while the prism 101 effects the reversal of the image 132 and in a top or bottom direction. At the same time the erecting lenses of the compound microscope system effect additional left for right and up for down reversals of the right-eye image 132. In order to properly view the images 131, 132 in rotated condition wherein they are erect and unreversed in a left to right sense, it becomes necessary to mount each transparent image 131, 132 so that while each is erect in a top to bottom sense each is reversed in a left to right sense whereby the right side of each image 131, 132 is located toward the left-hand side of the viewer, i. e., the closest to the optic axis 95.

Lens systems similar to those heretofore described are utilized on the optic axes 95 and 96. In this regard, the eye lens for the simple microscope system is inserted between the prism 100 and the observation station 97. The erecting lenses may be located between the image 132 and the entering face 107 of the prism 101 or the erected lenses may be positioned at any location on the is a pair of plano-convex lenses forming an eyepiece, and wherein the last-named lens means is composed of a plano-convex lens and a doublet.

5. A device according to claim 1 wherein the plane in which the pair of stereoscopic pictures is mounted is substantially parallel to a plane containing those portions of the optical axes on which are located the positive lens means of the first and second optical systems.

6. A device according to claim 1 wherein the plane in which the pair of stereoscopic pictures is mounted is substantially parallel to a plane containing those portions of the optical axes of the first and second optical systems on which are located the positive lens means and reflecting means of the first optical system, and the positive lens means, reflecting means, and image-forming lens means of the second optical system.

7. A device for viewing a pair of stereoscopic pictures which are so printed on a given area of sheet material that the bottom edge of one picture is contiguous with the top edge of the other, said device comprising a housing having a pair of viewing apertures which are spaced apart substantially according to the human interocular, means for mounting said area of sheet material in said housing so that said pair of pictures are inverted and lie in a given plane, means for illuminating said pictures, and a first and second optical system contained in said housing for providing necessary deviation and reversal of image-forming light rays to obtain fusible, erect stereoscopic images of said pictures having a separation substantially equal to said interocular, said first optical system comprising positive lens means optically aligned with one of said viewing apertures, and reflecting means positioned substantially at 45° on the optical axis of said lens means for deviating said axis substantially at 90° to a central point of a first of said pair of inverted pictures, said first optical system providing a magnified and erect image of said first picture, and said second optical system comprising positive lens means optically aligned with the other of said viewing apertures, a first reflecting means positioned substantially at 45° on the optical axis of said positive lens means for deviating said axis substantially at 90° to in part establish said interocular, a second reflecting means positioned substantially at 45° on said deviated axis for further deviating said axis substantially at 90°, a third reflecting means positioned substantially at 45° on said last-named deviated axis for further deviating said axis substantially at 90° to a central point of the second of said pair of inverted pictures, an image-forming relay lens means positioned at a given location on said deviated axis, said second optical system providing a magnified and erect image of said second picture which is spaced from the image of said first picture by said interocular and which forms a fusible stereoscopic image therewith.

8. A device according to claim 7 wherein said last-named lens means of the second optical system comprises a pair of lenses one of which is positioned on said deviated optical axis between said first and said second reflecting means, and the other of which is positioned on said deviated optical axis between said second and said third reflecting means.

9. A device according to claim 7 wherein a pair of planes containing, respectively, the reflecting means of the first optical system and the third reflecting means of the second optical system intersect to form an angle of substantially 90°, and wherein a pair of planes containing, respectively, the first and second reflecting means of the second optical system intersect to form an angle of substantially 90°.

10. A device according to claim 9 wherein the lines of intersection of said first- and second-named pairs of planes lie in directions substantially at 90° with respect to one another and are so spaced apart that any extension of said lines of intersection would be nonintersecting.

References Cited in the file of this patent

UNITED STATES PATENTS

| 933,844 | Kellner | Sept. 14, 1909 |
| 2,282,151 | Austin | May 5, 1942 |
| 2,289,467 | Taylor | July 14, 1942 |
| 2,313,562 | Mainardi et al. | Mar. 9, 1943 |

FOREIGN PATENTS

| 26,248 | Great Britain | of 1902 |
| 498,167 | France | Oct. 8, 1919 |
| 104,944 | Austria | Dec. 10, 1926 |